July 17, 1956  G. R. DODSON  2,754,957
CONVEYOR FLIGHT
Filed June 11, 1953  3 Sheets-Sheet 1
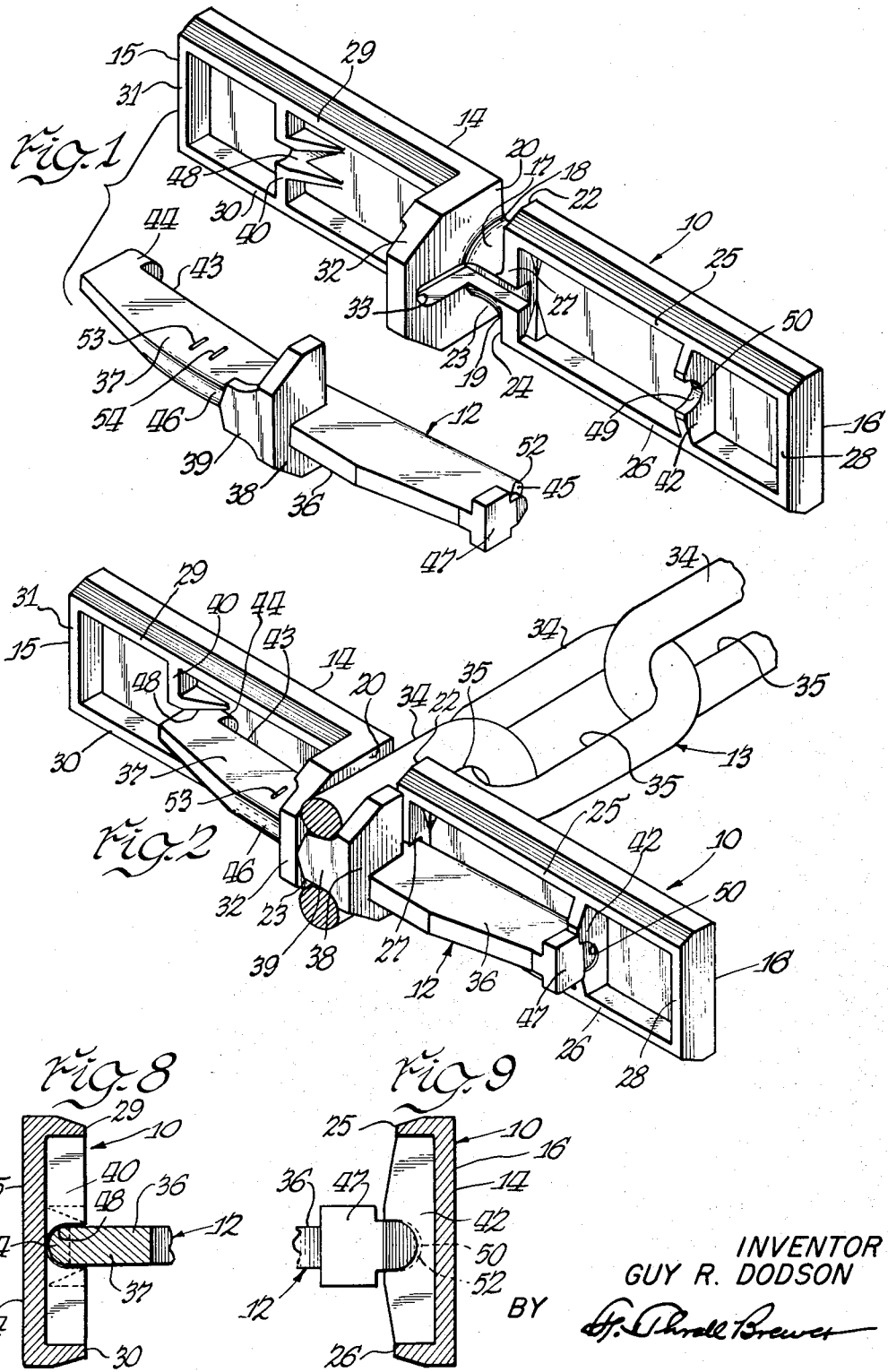
INVENTOR
GUY R. DODSON
BY
ATTORNEY July 17, 1956
G. R. DODSON
2,754,957
CONVEYOR FLIGHT
Filed June 11, 1953
3 Sheets-Sheet 2
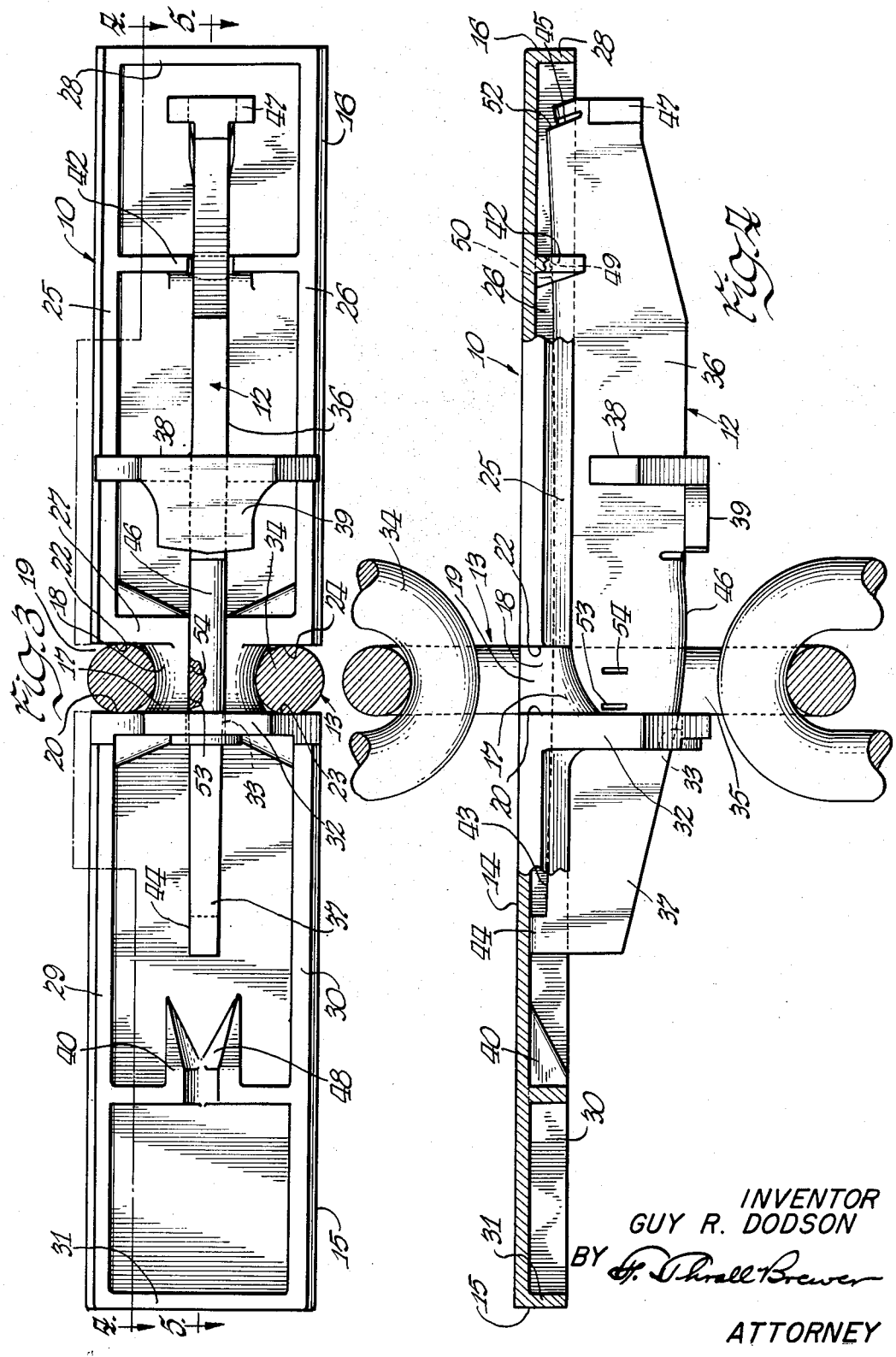
INVENTOR
GUY R. DODSON
BY
ATTORNEY

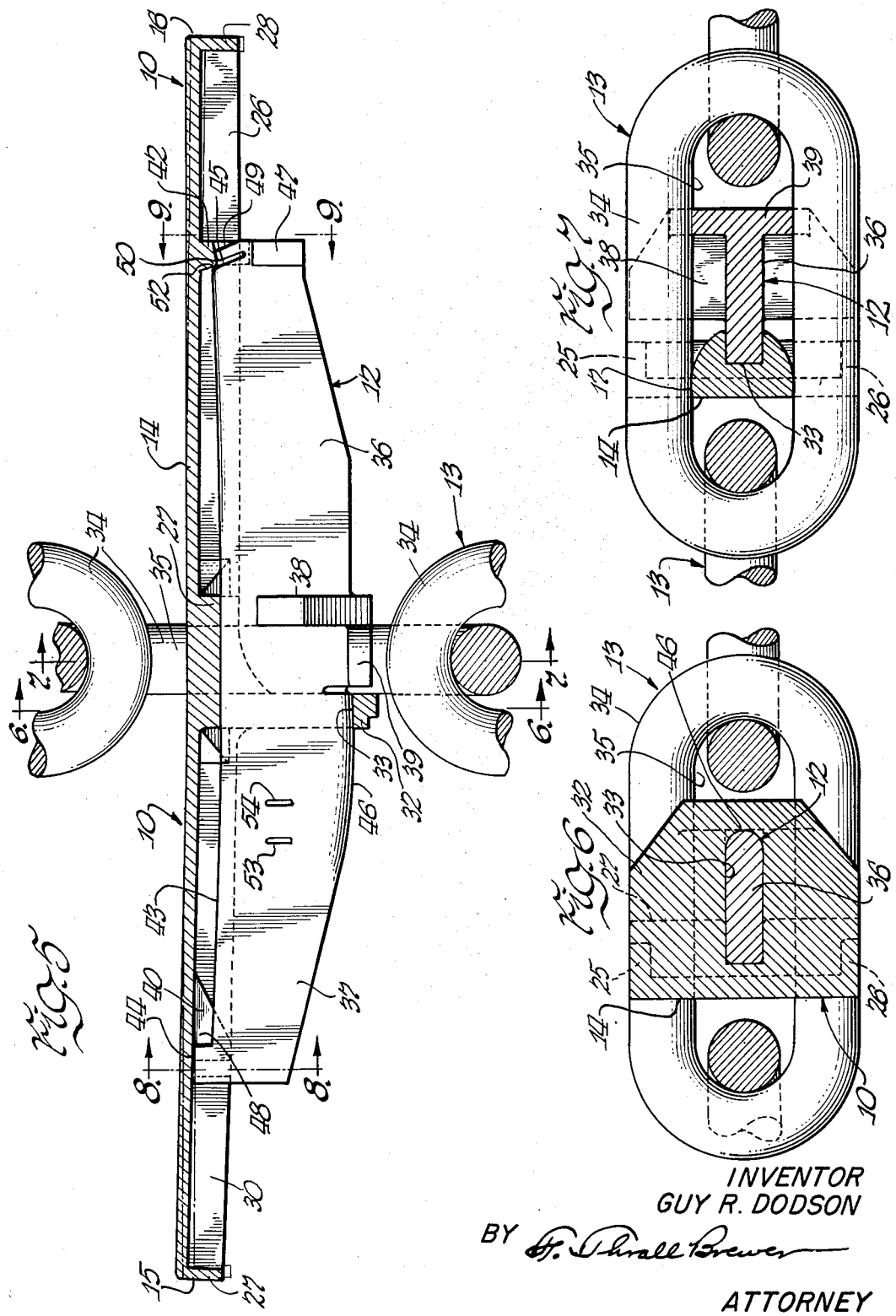

United States Patent Office 2,754,957
Patented July 17, 1956

2,754,957
CONVEYOR FLIGHT

Guy R. Dodson, Beaverton, Oreg., assignor to Electric Steel Foundry, Portland, Oreg., a corporation of Oregon Application June 11, 1953, Serial No. 360,871

9 Claims. (Cl. 198—176)

This invention relates to conveyor flights of the type adapted to be secured to, and moved in a predetermined path by a flexible driving element, such as a chain, and is concerned particularly with such conveyor flights which are readily securable to and removable from the flexible driving element.

One of the objects of my invention is to provide a conveyor flight embodying a unitary and integrally constructed main flight element and a removable key part which holds the flight securely in place on a flexible driving structure, such as a chain.

As another object, this invention has within its purview the provision of a conveyor flight requiring only a single and removable wedge type key for holding it in operative position relative to a driving element, such as a chain.

My invention further comprehends the provision of a conveyor flight of the type referred to and wherein the structures and arrangement of parts are such that substantial holding force is maintained between the main flight part and its holding key, so that wear between those parts during use is minimized.

It is another object of this invention to provide a conveyor flight including main and locking key parts which are adapted to interfit to hold the flight in place relative to a flexible driving element, and which parts are constructed so as to be readily matched in pairs which compensate for production variations in the sizes of the parts.

Other objects and advantages of the invention will be apparent from the following description and the accompanying drawings in which similar characters of reference indicate similar parts throughout the several views.

Referring to the three sheets of drawings:

Fig. 1 is an exploded view in perspective which shows the parts of a conveyor flight embodying this invention in a preferred form;

Fig. 2 is a perspective view of the conveyor flight depicted in Fig. 1, with the parts in assembled relationship, and illustrating the manner of attachment of the disclosed conveyor flight to a flexible driving element in the form of a chain;

Figs. 3 and 4 are respectively rear elevational and top plan views of my conveyor flight, which illustrate the parts in partially assembled relationship relative to a flexible driving element, such as a chain, and wherein portions of the structure in Fig. 4 are depicted in section with the section taken substantially as indicated by a line 4—4 in Fig. 3 and when viewed in the direction of accompanying arrows;

Fig. 5 is a top sectional view taken substantially at the position of a line 5—5 in Fig. 3, but showing the conveyor flight parts in their fully assembled relationship;

Figs. 6 and 7 are respectively end sectional views wherein the sections are taken substantially on lines 6—6 and 7—7 of Fig. 5 and in the directions of the arrows; and Figs. 8 and 9 are end sectional views taken substantially at the position of lines 8—8 and 9—9 respectively of Fig. 5 and in the directions indicated by arrows.

In the accompanying drawings, I have illustrated a conveyor flight which is illustrative of a preferred embodiment of my invention and which embodies, as its two principal parts, a main conveyor flight part 10 and a key 12, which parts, in their assembled relationship, are adapted to removable attachment to a flexible driving element, such as a chain 13. It may be readily understood that conveyor flights of the type herein disclosed are connected in spaced relationship along such a chain and are motivated by force applied through the chain to move along a base structure, such as a conveyor trough (not shown). The length of each conveyor flight, from end to end, is determined by the width of the trough, and the flights are moved in a direction such that their flat front faces 14 face forwardly. Also, in use, those flat front faces 14 are normally upright with respect to the base or trough along which the flight is moved.

The main flight part 10 of each conveyor flight constitutes an integrally cast, one-piece structure having end portions 15 and 16 in aligned and opposed relationship and joined at adjacent ends through an integral chain engaging portion 17, which chain engaging portion is narrower than the end portions in a direction lateral to the flat front surface 14 and is disposed to provide opposed chain receiving recesses 18 and 19 at the top and bottom of the mid-portion of the main flight part. Thus, chain engaging shoulders 20 and 22 define opposite sides of the recess 18 and chain engaging shoulders 23 and 24 define the opposite sides of the recess 19.

In my disclosed structure, the end portion 16 of the main flight part is preferably reinforced along the rear surface by top and bottom flanges 25 and 26 and by end flanges 27 and 28. Also, the end portion 15 is similarly reinforced by top and bottom flanges 29 and 30, and by an outer end flange 31. At the inner end of the end portion 15, adjacent the chain engaging portion 17 and in flush relationship to the shoulders 20 and 23, an integral flange 32 projects rearwardly in substantially right-angular relationship to the front face 14 of the main flight part. A key receiving opening 33 is provided in the mid-portion of the flange 32, which opening has an axis extending longitudinally of the end portions of the main flight part and, in the particular form illustrated, extends into the chain engaging portion 17 and the flange 27. This opening is also elongated in a plane perpendicular to the flat front surface 14.

In use, it is contemplated that the chain 13 which is used to move conveyor flights of the type disclosed would embody links such as 34 having elongated openings such as 35 therethrough, and that the openings through the links will be of sufficient length between the ends of adjoining links that the end portion 16 of a main conveyor flight part can be readily passed therethrough when the conveyor flight part is turned so that the lateral dimension of the flat front face 14 extends longitudinally of the link. When thus inserted in a link until the sides of that link engage the inner face of the flange 32, the main flight part can be turned so that the lateral dimension of the flat front face of each end portion extends across the link and opposite side portions of the link are respectively disposed in the recesses 18 and 19 and between the shoulders 20, 22, 23 and 24 of the main flight part. It may be observed that the rear surface of the chain engaging portion 17 is rounded to facilitate the turning of the main flight part relative to the chain link after that part is inserted through the link.

Further to secure the main flight part in place relative to a link 34 of the chain 13 and to prevent turning of the main flight part relative to the link to which it is secured, I utilize the key 12. This key, in the disclosed embodiment of my invention, has an elongated body portion 36 and sectional dimensions such that it is wider and more rigid in a direction perpendicular to the front face 14 of the main flight part than in its transverse lateral dimension. One end portion 37 of the key has sectional dimensions such that it can be inserted longitudinally into the key receiving opening 33 in the flange 32 of the main flight part. At the mid-portion of the key and extending laterally therefrom is a flange 38, which flange, when the key is fully inserted into the main flight part, as shown in Figs. 2 and 5, assumes a position in substantial alignment with the flange 27 on the main flight part, and such that one of its surfaces is flush with the shoulders 22 and 24 of the main flight part and in spaced and opposed relationship relative to the surface of the flange 32 on the main flight part. This flange 38 on the key provides additional assurance that the main flight part will be maintained in its operative position longitudinally and angularly with respect to the link 34 of the chain with which it is engaged. A second flange 39 extends away from the flange 38 along the rear surface of the key and has lateral dimensions substantially corresponding to the lateral dimension of the chain engaging portion 17 of the main flight part, so that this flange 39 will fit into the opening 35 of a chain link at a position spaced longitudinally of the chain link from the chain engaging portion 17, thereby providing a chain engaging portion on the flange 38 which prevents turning of the main flight part relative to the chain link with which it is engaged.

For holding the key 12 firmly and securely in place relative to the main flight part, the disclosed structure includes key retaining elements 40 and 42 on the rear face of the main flight part and has the key 12 constructed and arranged, as will be more fully described, so that in addition to engaging with the key retaining elements 40 and 42, it also engages the flange 32 of the main flight part internally of the opening 33 and on the side thereof remote from the front face of the main flight part. Furthermore, in the conveyor flight structure herein disclosed, the working engagement of the key with the main flight part effects a small amount of longitudinal flexure of the main flight part, thereby to produce and maintain tight engagement between the main flight part and key, which minimizes frictional wear.

As depicted in the drawings, the elongated body portion 36 of the key 12 is oblong in section and is utilized in conjunction with the main flight part in a position such that one of the narrower surfaces of the elongated body portion faces the back surface of the main flight part and the wider body portion surfaces are substantially normal to the front face of the main flight part. Thus, with this arrangement the key body portion has its maximum rigidity in a plane which extends longitudinally of the main flight part and which is normal to the front face of that part. Furthermore, the front surface of the key which faces the rear of the main flight part in use is cut away along the mid-portion of the key, as indicated at 43, whereby the operational engagement between the main flight part and the key is provided through a projecting lug 44 at one end of the key and a recessed portion 45 at the opposite end of the key, which lug and recessed portion engage the key retaining elements 40 and 42 respectively, while a surface portion 46 on the rear of the key engages the flange 32 on the main flight part internally of the opening 33. It may be observed that this arrangement of parts effectively provides three main points of contact between the key and the main flight part, which points of contact are so disposed that the engagement at the mid-portion of the key with the flange 32 opposes those at the ends of the key whereupon, with a tight fit between the key and the main flight part, the endwise driving of the key into place relative to the main flight part and through the opening 33 tends to effect longitudinal flexure of the main flight part in directions such that the outer end portions of that main flight part are flexed forwardly of the mid-portion of that part, as shown in Fig. 5 in solid lines, the normal shape of the main flight part being indicated in that figure by dot-and-dash lines. A head portion 47 is provided at the recessed end of the key to provide surfaces for driving the key into and from its operating position relative to the main flight part.

The key retaining elements 40 and 42 have recesses 48 and 49 respectively therein, which recesses are aligned with the opening 33 and serve as guides for the key. Also, the key retaining element 42 has an inner edge 50 spaced from the rear face of the main flight part and at the bottom of the recess 49, which edge extends into the recessed portion 45 of the key in opposed relationship to a shoulder 52 on the key when the key is in its operating position relative to the main flight part, as shown in Fig. 5. Thus, the opposed surfaces of the key retaining element 42 and the shoulder 52 on the key normally hold the key in place relative to the main flight part longitudinally of the main flight part.

Since there are production variations, within reasonable limits, in the manufacture of the main flight parts and keys, and since accurate machine work is to be avoided from the standpoint of cost, I have provided a system by which keys and main flight parts can be readily paired or selected for use together to afford a proper fit in each instance, which is not loose enough to permit frictional wear between the main flight part and the key or too tight to allow the ready insertion or removal of the key. For this purpose, I utilize gage marks 53 and 54 on one surface of the key, which gage marks, by their respective positions relative to the flat chain engaging surface of the flange 32 on the main flight part when the key is manually inserted toward its operating position, indicate the allowable limits for obtaining a desired fit. That is, if the key cannot be inserted to a position such that the gage mark 53 is brought into alignment with the chain engaging surface of the flange 32, the key is too large for the particular main flight part with which it is being paired. For a proper fit, the flat chain engaging surface of the flange 32 should come between the gage marks when the key is manually inserted through the opening 33. Likewise, it follows that if both gage marks pass the flat chain engaging surface of the flange 32, the key is too small to provide a proper fit with the main flight part with which it is paired. Upon the pairing of a key and the main flight part which fit properly, as indicated by the gage marks, the key is then driven into its interlocking engagement with the respective key engaging surfaces of the main flight part.

From the foregoing description and reference to the accompanying drawings, it may be readily understood that I have provided a two-piece conveyor flight embodying an integral main flight part and an integral key which, although adapted to lock firmly and securely in position relative to a flexible conveyor driving element such as a chain, can be removed when desired and the parts can be reassembled and reused after such disassembly. Furthermore, the main flight parts and keys can be readily paired to compensate for production variations and to provide properly fitting flight parts either when new or after use.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A conveyor flight adapted to removable attachment to a flexible driving element such as a chain and comprising, in combination, a main conveyor flight part presenting a substantially flat front surface and having end portions of corresponding lengths in opposed and substantially aligned relationship, said end portions being integrally joined at adjacent ends through a chain engaging portion which is narrower than the end portions in a direction lateral to the flat front surface and disposed relative to the end portions so as to provide pairs of spaced chain engaging shoulders in opposed relationship at the mid-portion of said part, a flange projecting rearwardly from the main conveyor flight part at only one end of the chain engaging portion and having a surface flush with the shoulders at said one end of said chain engaging portion, a key receiving opening extending through said flange in a direction longitudinal of the main conveyor flight part, a key part having a sectional size for fitting into said opening, and means on said end portions of the main conveyor part and separated from said flange for releasably retaining the key part in the opening.

2. A conveyor flight as defined in claim 1, and wherein the position of said opening in a direction normal to the front surface of the main flight part and the dimensions of the key part are preselected in reference to the sectional dimensions of said chain engaging portion so that in assembled relationship the key part and chain engaging portion together have a larger dimension perpendicular to the said front surface than in a direction laterally parallel thereto.

3. In a conveyor flight adapted to removable attachment to a flexible driving element such as a chain, a main flight part including means at its mid-portion providing a key receiving opening and having key engaging portions thereon at positions spaced from opposite ends of said opening, and a key slidable into said opening from one end and having portions at opposite ends for key retaining engagement with the key engaging portions on the main flight part to force the mid-portion thereof into engagement with said means on the side of the opening remote from the key engaging portions.

4. In a conveyor flight adapted to removable attachment to a driving element such as a chain, a flight retaining key comprising an elongated body which is oblong in section so as to have laterally narrow side surfaces in opposed relationship and laterally wide side surfaces adjoining the laterally narrow side surfaces, one of said laterally narrow side surfaces being concavely shaped intermediate the ends and its opposed narrow side surface being correspondingly bowed toward the mid-portion thereof to provide end and intermediate flight engaging surfaces facing in opposite directions, and an integral flange projecting laterally from the mid-portion of at least one of the wide side surfaces to provide a chain engaging surface.

5. A conveyor flight adapted for attachment to a chain link of predetermined size and having an elongated opening therein, and comprising an elongated main flight part having end portions in opposed relationship presenting plane front faces which are both wider than the width of the opening of the link and joined through a chain engaging portion, one of said end portions having a sectional shape and size such that it will pass freely through the link when the front face thereof is disposed longitudinally of the link, said chain engaging portion being of a length and lateral size to permit rotation of the main flight part to a position such that the front faces extend laterally of the narrower dimension of the link opening, said main flight part having key engaging portions at the mid-portion thereof and at positions spaced outwardly toward the ends from the mid-portion, and an elongated key of a sectional size to pass through the link adjacent the chain engaging portion of the main flight part and having flight engaging surfaces thereon aligned for engagement with the key engaging portions of the flight, said key also having link engaging surfaces thereon for preventing rotation of the flight relative to the link.

6. A conveyor flight adapted to removable attachment to a flexible driving element such as a chain and comprising, in combination, a main conveyor flight part presenting a substantially flat front surface and having end portions of corresponding lengths in opposed and substantially aligned relationship, said end portions being integrally joined at adjacent ends through a chain engaging portion which is narrower than the end portions in a direction lateral to the flat front surface and disposed relative to the end portions so as to provide pairs of spaced chain engaging shoulders in opposed relationship at the mid-portion of said part, a flange projecting rearwardly from the main conveyor flight part and having a surface in substantial alignment with the shoulders at one end of said chain engaging portion, a key receiving opening extending through said flange in a direction longitudinal of the main conveyor flight part, a key part having a sectional size for fitting into said opening, and means for releasably retaining the key part in the opening, and said key part having a flange projecting outwardly at the mid-portion thereof at a position for alignment with the shoulders at the other end of said chain engaging portion when the key part is inserted into the key receiving opening.

7. A conveyor flight adapted to removable attachment to a flexible driving element such as a chain and comprising, in combination, a main conveyor flight part presenting a substantially flat front surface and having end portions of corresponding lengths in opposed and substantially aligned relationship, said end portions being integrally joined at adjacent ends through a chain engaging portion which is narrower than the end portion in a direction lateral to the flat front surface and disposed relative to the end portions so as to provide pairs of spaced chain engaging shoulders in opposed relationship at the mid-portion of said part, a flange projecting rearwardly from the main conveyor flight part and having a surface in substantial alignment with the shoulders at one end of said chain engaging portion, a key receiving opening extending through said flange in a direction longitudinal of the main conveyor flight part, a key part having a sectional size for fitting into said opening, and means for releasably retaining the key part in the opening, and said key part having flight part engaging portions at its opposite ends and being longitudinally and laterally shaped to effect flexure of the main flight part when engaged therewith at said opposite ends and at said opening, thereby to maintain firm engagement between the main flight part and said key part.

8. In a conveyor flight adapted to removable attachment to a flexible driving element such as a chain, a main flight part including means at its mid-portion providing a key receiving opening and having key engaging portions spaced from opposite ends of said opening, and a key slidable into said opening from one end and having portions at opposite ends for key retaining engagement with the key engaging portions while the mid-portion thereof engages said means on the side of the opening remote from the key engaging portions, said main flight part being subject to flexure in a longitudinal plane, and said key being shaped to effect such flexure of the main flight part when brought into engagement with said means and said key retaining portions.

9. In a conveyor flight adapted to removable attachment to a flexible driving element such as a chain, a one-piece main flight part having a front surface and comprising end portions of corresponding lengths in opposed relationship, and said end portions being integrally joined at adjacent ends through a chain engaging portion which is narrower than the end portions in a direction lateral to the front surface and disposed relative to said end portions so as to provide pairs of spaced chain engaging shoulders in opposed relationship at the mid-portion of said flight part, said one-piece main flight part being further characterized by an integral flange projecting rearwardly from only one end portion thereof and having a surface in substantially flush relationship to the shoulders at one end of the chain engaging portion, said flange having a key receiving opening extending therethrough in a direction longitudinal of said flight part, and key engaging elements on the said end portions and spaced from said flange.

References Cited in the file of this patent

UNITED STATES PATENTS

| | | |
|---|---|---|
| 357,723 | McNeill | Feb. 15, 1887 |
| 391,756 | Maxon | Oct. 23, 1888 |
| 969,145 | Morris | Aug. 30, 1910 |
| 1,427,229 | Robbins et al. | Aug. 29, 1922 |
| 1,850,686 | Pangborn | Mar. 22, 1932 |